United States Patent
Shah

(10) Patent No.: US 6,993,414 B2
(45) Date of Patent: Jan. 31, 2006

(54) DETECTION OF CLOGGED FILTER IN AN HVAC SYSTEM

(75) Inventor: Rajendra K. Shah, Indianapolis, IN (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/739,690

(22) Filed: Dec. 18, 2003

(65) Prior Publication Data

US 2005/0154495 A1 Jul. 14, 2005

(51) Int. Cl.
G05D 23/00 (2006.01)

(52) U.S. Cl. ...................................... 700/276; 340/607

(58) Field of Classification Search ........ 700/275–278, 700/281, 282, 301; 340/606–611
See application file for complete search history.

(56) References Cited

U.S. PATENT DOCUMENTS

| | | | | |
|---|---|---|---|---|
| 4,751,501 A | * | 6/1988 | Gut | 340/607 |
| 5,036,698 A | * | 8/1991 | Conti | 73/38 |
| 5,150,604 A | * | 9/1992 | Succi et al. | 73/38 |
| 5,271,750 A | * | 12/1993 | Abbott et al. | 96/400 |
| 5,351,035 A | * | 9/1994 | Chrisco | 340/607 |
| 5,461,368 A | * | 10/1995 | Comer | 340/607 |
| 5,511,413 A | * | 4/1996 | Pfister et al. | 73/118.1 |
| 5,606,311 A | * | 2/1997 | Polidan et al. | 340/607 |
| 5,681,988 A | * | 10/1997 | Koch et al. | 73/118.1 |
| 6,107,923 A | * | 8/2000 | Christol | 340/607 |
| 6,334,959 B1 | * | 1/2002 | Sutton et al. | 210/767 |
| 6,377,171 B1 | * | 4/2002 | Fewel | 340/522 |
| 6,448,896 B1 | | 9/2002 | Bankus | |
| 6,703,937 B1 | * | 3/2004 | Franz et al. | 340/607 |

OTHER PUBLICATIONS

U.S. Patent Application: "Method of Determining Static Pressure in a Ducted Air Delivery System Using a Variable Speed Blower Motor", U.S. Appl. No. 10/426,463; Filed Apr. 30, 2003.
International Search Report, May 5, 2005.

* cited by examiner

Primary Examiner—Maria N. Von Buhr
(74) Attorney, Agent, or Firm—Carlson, Gaskey & Olds

(57) ABSTRACT

Static pressures are measured in an HVAC system and utilized to predict the condition of a filter in the HVAC system. As the filter becomes clogged, the static pressure can be expected to increase. Changes in the static pressure are determined periodically, and utilized to predict the condition of the filter. A display provides a user with an indication of the current condition of the filter, and a recommendation to replace the filter once it reaches a predetermined condition.

11 Claims, 1 Drawing Sheet

DETECTION OF CLOGGED FILTER IN AN HVAC SYSTEM

BACKGROUND OF THE INVENTION

This invention utilizes pressure measurements in an HVAC system to determine when an air filter has been clogged to the point that it should be replaced.

Filters are utilized to provide clean air to an HVAC system for circulation within an environment to be heated or cooled. As is known, the filter is typically placed upstream of a fan, and air is sucked through the filter, with impurities removed from the air.

Over time, the filter becomes clogged, and eventually should be replaced. A clogged filter presents challenges to the further operation of the fan, and increases the load on the fan. Further, at some point, the filter may become so full that it ceases to allow air flow, which is also undesirable.

In the prior art, there have been recommendations for periodic replacement of the filter. As an example, one known thermostat is provided with a signal recommending filter replacement after a period of time since the prior filter replacement. However, such systems are based upon assumptions of filter condition, and not on actual filter condition. Such assumptions can result in the filter being replaced too frequently, or not frequently enough.

One known system utilizes a control that monitors the fan speed, and predicts that the filter may be dirty, if fan speed indicates the filter is dirty. While this method is more beneficial than the prior art "assumption" method, it would still be desirable to provide alternative ways of determining filter condition.

SUMMARY OF THE INVENTION

In a disclosed embodiment of this invention, a pressure measurement is taken, and evaluated to determine the filter condition. In an embodiment, a change in measured static pressure is evaluated, and is utilized to predict the percentage that a filter is clogged.

In an embodiment, an "initial" static pressure reading is taken under the assumption that the filter is clean. A "current" static pressure reading is then taken periodically, and compared to this initial pressure. Changes between initial pressure and current pressure are utilized to determine the condition of the filter.

These and other features of the present invention can be best understood from the following specification and drawings, the following of which is a brief description.

DETAILED DESCRIPTION OF THE PREFERRED EMBODIMENT

Figure 1:
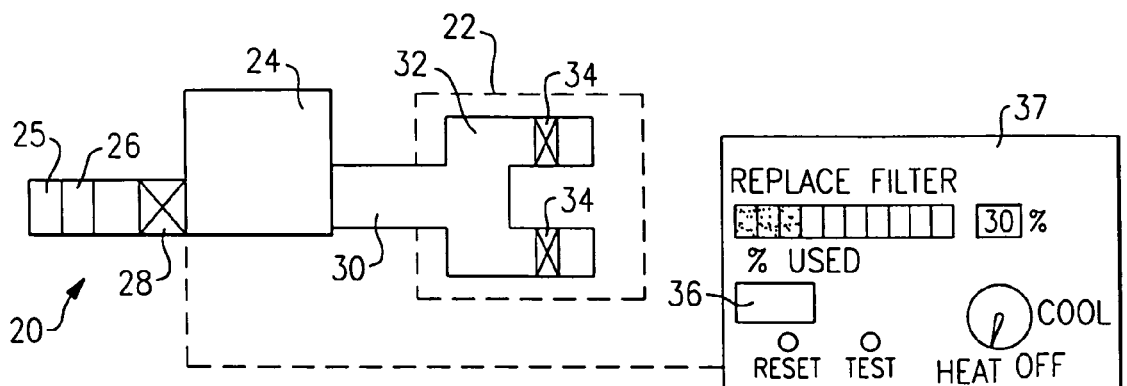
FIG. 1 is a schematic view of an HVAC system.

An HVAC system 20 is illustrated schematically in FIG. 1. As shown, HVAC system 20 operates to heat or cool an environment 22. A component 24, such as a furnace, is provided with air from an inlet air duct 25. Typically, a filter 26 is placed on the inlet air duct 25, and upstream of a fan 28. Fan 28 pulls air through inlet duct 25, filter 26, and through the furnace 24. From the furnace 24, the air is directed into a duct 30, and then into various zones through sub-ducts 32, having dampers 34.

As mentioned above, it is desirable to periodically replace the filter 26 as it may become clogged. The present invention relates to a method of determining when the filter 26 should be replaced. A control 36, such as a microprocessor, is shown associated with the thermostat 37, and is operable to provide information on the filter 26.

The present invention relies upon a recognition that static pressure is the sum of pressure drops at three points, namely, through the duct system, across the furnace, and across the filter. The pressure drops through the duct and furnace are generally constant and predictable at any given air flow. However, the pressure drop across the filter increases over time as the filter becomes loaded with dirt.

Static pressure can be calculated as a function of the delivered air flow, and the sensed fan motor speed, taken with constants characterizing the particular furnace and fan model. A most preferred algorithm for determining static pressure is disclosed in U.S. patent application Ser. No. 10/426,463, filed Apr. 30, 2003 and entitled "Method of Determining Static Pressure in a Ducted Air Delivery System Using a Variable Speed Blower Motor," the entire disclosure of which is incorporated herein by reference.

This invention recognizes that changes in static pressure are indicative of the changing condition of the filter 26. This recognition is utilized to provide feedback at the thermostat 37 of the actual condition of the filter 26. As can be seen, the thermostat 37 has a visual "filter used %" display bar.

In a preferred method, the system takes an initial static pressure measurement. This may be done initially when the system is first powered up and installed, or any time a homeowner manually initiates a filter initiation by hitting a reset button. This initial static pressure is associated in control 36 at thermostat 37 with a new or clean filter. Changes from this initial static pressure are taken to be indicative of the changing condition of the filter.

Current static pressure measurements are taken periodically. These measurements may be done per each unit of time, e.g., once a day, again under the control of microprocessor 36. The measurement could also be taken any time a user interface switches the system to off from an operating mode, such as is done in association with a filter change.

As an aside, if the "current" static pressure measurement is ever less than the "initial" static pressure measurement, the newly read current static pressure measurement is substituted for the previously stored initial static pressure.

The static pressure measurements are preferably taken by microprocessor 36 turning off the heating or cooling mode for a fan pre-run period of time such as five minutes. The fan 28 is preferably run at less than 100% of nominal cooling air flow (e.g., 70%). When the measurement is done in response to a manual switch from off to an operating mode, this continuous fan pre-run time before the measurement is reduced to two minutes to provide a quicker response for a user wishing to see the result of a filter change. The 70% level of fan operation is chosen to minimize noise during this measurement process, while still providing adequate resolution.

During the measurement, the fan motor speed readings are taken several times, such as six times at 10-second intervals. These readings are then preferably averaged. If the filter used bar on the thermostat 37 is viewed during this process, the used percentage is preferably not shown. Instead, most preferably, some indication that an ongoing measurement is taking place (e.g., MEASURING) is displayed.

If heating or cooling is interrupted to compute the measurement, a control logic in microprocessor 36, preferably ensures that staging timers do not further delay the provision of heating or cooling once the measurement is complete. As mentioned above, the static pressure is most preferably determined based upon the proprietary formula mentioned in the above-referenced application. However, a worker of ordinary skill in the art would be able to establish other ways of determining static pressure. Given the reduction of the fan motor to 70%, some multiplier is preferably multiplied by the determined static pressure to get to the actual value (i.e., two times the measured value to provide a value at full nominal cooling air flow).

A maximum static pressure may also be identified. This represents the capability of the indoor fan to deliver full cooling air flow against a clogged filter. This maximum static pressure is indicative of a fully clogged filter 26, and is determined based upon the furnace and fan model, and the AC or heat pump size relative to the largest allowable AC and heat pump size. That is, the maximum static pressure is defined as some system characteristic, which would vary dependent upon the select combination of components in the system, but which would otherwise be generally fixed for the system once determined. This maximum static pressure is preferably stored within microprocessor 36. The maximum static pressure may be determined once microprocessor 36 understands each of the several components in the actual system, or could be some pre-set number that is an approximation of what is likely to be a preferred maximum static pressure.

Figure 2:
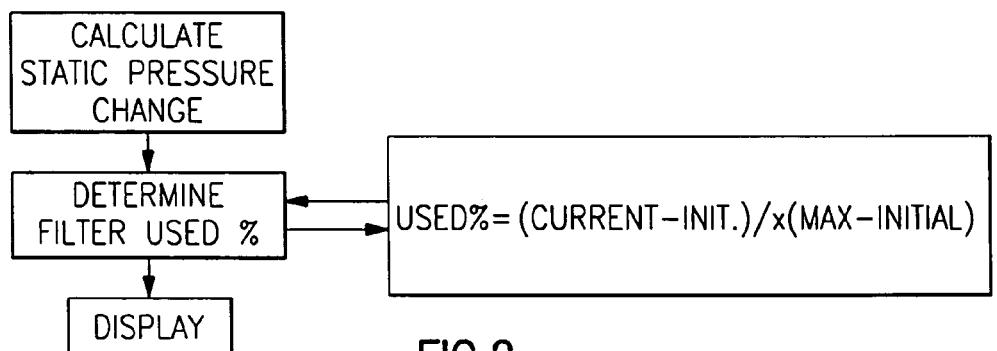
FIG. 2 is a flowchart of the present invention.

As shown in FIG. 2, once the static pressure measurements are complete, a filter used percentage calculation can be taken. In the flowchart of FIG. 2, it can be seen that the preferred method takes up the difference between a current static pressure and the initial pressure, and divides that by a percentage of the difference between maximum and initial. Most preferably, the filter used percentage is rounded up or down to the nearest 10%, towards its previous value to provide some desired hysteresis. On the other hand, if the filter used percentage is less than 5%, it is preferably rounded down to 0%. This will ensure that when a clean filter 26 replaces a prior filter 26, it will begin with a 0% reading.

If the filter used percentage is 100% or greater, the used bar on the thermostat 36 is shown filled out but a printed out numeric value preferably shows the actual determined percentage number even if it is higher than 100%.

Most preferably, the following formula is used:

FILTER USED %=(CURRENT-INITIAL)/(0.6*(MAXIMUM-INITIAL)).

Figure 3:
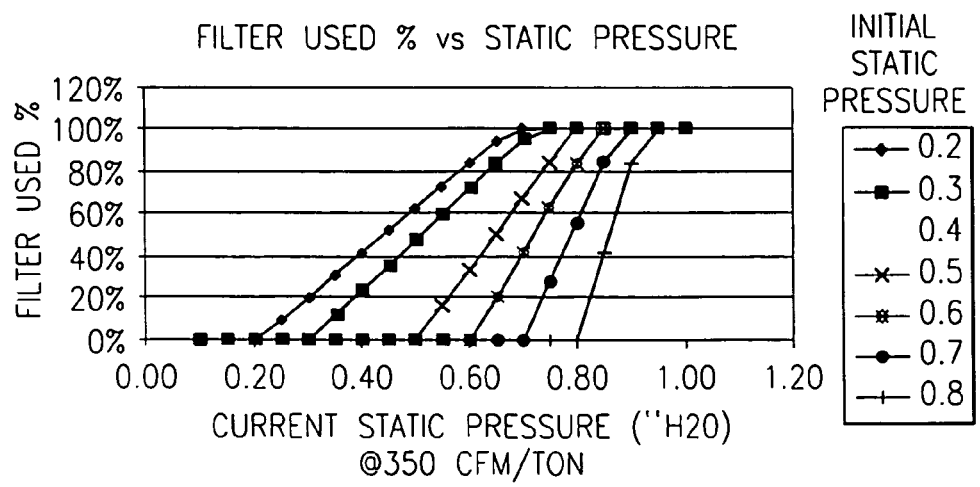
FIG. 3 is a graph of experimental values.

The preferred formula takes into account both how much the filter 26 has loaded up (current-initial) as well as how much initial pressure drop the system is capable of tolerating (maximum-initial). The multiplier X (e.g. 0.6) allows different initial values to result in 100% loading values. Of course, multipliers other than 0.6 can be used. A lower initial pressure drop results in a greater allowable increase before the filter is used up. On the other hand, a higher initial pressure drop allows less room to increase, but the filter life may end at a higher absolute static pressure if it is still within the acceptable limit. This is shown for example in the graph shown in FIG. 3 which is a measurement of varying "filter used" versus "current static pressure." Note that higher current pressures are achieved as "filter used" approaches 100%, given distinct and increasing initial static pressures.

In a zoned system, the method described above may be generally repeated, however it is most desirable that all of the dampers 34 are held open during the measurement process. There may be developments of various systems that can predict a static pressure in a "common" part of a zoned system. That is, the static pressure may be determined in areas that are not specific to the zones (i.e., not including sub-ducts 32). Since the filter 26 is within this common area, it is only this static pressure that is necessary for this invention.

In sum, the present invention defines a method for determining the actual condition of a filter 26, and a prediction of its percentage of remaining life. Since it is actual condition that is utilized, the invention more accurately predicts the condition of the filter 26, and ensures filters 26 are replaced when necessary, but at the same time eliminates replacement of a filter 26 that still has remaining useful life.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An HVAC system comprising:
   a fan, and a supply duct for supplying air to said fan, said fan being operable to deliver air from said supply duct to an environment to be conditioned, and a filter mounted to remove impurities from said air being delivered by said fan to said environment;
   a control being operable to receive an indication of pressures within said system, and determine the condition of said filter based upon said pressures;
   said pressures received by said control includes both a previous pressure and a current pressure, and the difference between said current and previous pressures being utilized to provide an indication of the condition of a filter; and a display provides an indication of a percentage clogged condition of the filter.

2. The HVAC system as set forth in claim 1, wherein a maximum pressure is defined, and if said current pressure exceeds said maximum pressure, then an indication is made that the filter is immediately in need of replacement.

3. The HVAC system as set forth in claim 1, wherein said display includes an indication of a suggestion to replace the filter once said condition of said filter reaches a predetermined condition.

4. The HVAC system as set forth in claim 1, wherein said previous pressure is an initial pressure.

5. The HVAC system as set forth in claim 4, wherein said control receives a replacement for said previous pressure when a reset button associated with said control is actuated.

6. The HVAC system as set forth in claim 1, wherein said current and previous pressure are static pressure readings.

7. An HVAC system comprising:
   a fan and a supply duct for supplying air to said fan being operable to deliver air from said supply duct to an environment to be conditioned, and a filter mounted to remove impurities from said air being delivered by said fan to said environment;
   a control being operable to receive an indication of pressures within said system, and determine the condition of said filter based upon said pressures; and said pressures received by said control includes both a previous pressure and a current pressure, and the difference between said current and previous pressures being utilized to provide an indication of the condition of a filter;

said current and previous pressure are static pressure readings; and said current and previous static pressure readings are utilized with the following formula to determine filter condition:

$$\text{FILTER USED }\% = (\text{CURRENT-PREVIOUS})/(X*(\text{MAXIMUM-PREVIOUS})),$$

wherein x is a multiplier, and MAXIMUM is a previously defined maximum pressure indicative of a clogged filter.

8. The HVAC system as set forth in claim 7, wherein a display provides an indication of a percentage clogged condition of the filter.

9. The HVAC system as set forth in claim 7, wherein X is a multiplier that is less than 1.0.

10. The HVAC system as set forth in claim 9, wherein X is equal to 0.6.

11. The HVAC system as set forth in claim 7, wherein said previous pressure reading is an initial pressure reading.

* * * * *